(12) United States Patent
Burglin et al.

(10) Patent No.: US 9,371,463 B2
(45) Date of Patent: Jun. 21, 2016

(54) INKS AND A PROCESS FOR INK-JET PRINTING TEXTILE FIBRE MATERIALS

(71) Applicant: Huntsman International LLC, The Woodlands, TX (US)

(72) Inventors: Marc Burglin, Baldersheim (FR); Gilles Sperissen, Eschentzwiller (FR); Nathalie Stein, Porrentruy (FR); Mattia Perri, Basel (CH)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 14/425,059

(22) PCT Filed: Aug. 12, 2013

(86) PCT No.: PCT/EP2013/066809
§ 371 (c)(1),
(2) Date: Mar. 2, 2015

(87) PCT Pub. No.: WO2014/040810
PCT Pub. Date: Mar. 20, 2014

(65) Prior Publication Data
US 2015/0225584 A1 Aug. 13, 2015

(30) Foreign Application Priority Data
Sep. 12, 2012 (EP) .................................... 12006399

(51) Int. Cl.
*B41J 2/015* (2006.01)
*C09D 11/328* (2014.01)
*C09B 67/22* (2006.01)

(52) U.S. Cl.
CPC .......... *C09D 11/328* (2013.01); *C09B 67/0055* (2013.01)

(58) Field of Classification Search
CPC ...... B41J 2/1623; B41J 2/1631; B41J 2/1628; B41J 2/14024; B41J 2/1603; C09D 11/328; C09B 67/0055
USPC .......................................................... 347/20
See application file for complete search history.

(56) References Cited

U.S. PATENT DOCUMENTS

| 2005/0155163 A1* | 7/2005 | Griffin | C09B 67/0033 8/662 |
| 2008/0263789 A1* | 10/2008 | Clement | C09B 67/0041 8/639 |
| 2013/0255011 A1* | 10/2013 | Nowack | D06P 1/18 8/693 |

Primary Examiner — Alessandro Amari
Assistant Examiner — Yaovi M Ameh

(57) ABSTRACT

The present invention relates to aqueous inks comprising (A) at least one dye of the formula (1) wherein $R_1$ is $C_1$-$C_{12}$alkyl, or $C_2$-$C_{12}$alkyl interrupted by one or more oxygen atoms and/or —COO— groups, and $R_2$, $R_3$, $R_4$ and $R_5$ each independently of the others is hydrogen, $C_1$-$C_{12}$alkyl, chlorine, bromine, hydroxy or amino; (B) at least one dye of the formula (2) wherein $R_6$ is hydrogen, bromine, chlorine or cyano, $R_7$ is trifluoromethyl, bromine or chlorine, $R_8$ is hydrogen, methyl or acetylamino, $R_9$ and $R_{10}$ each independently of the other is $C_1$-$C_4$alkyl unsubstituted or substituted by cyano or by acyloxy, one of the $C_1$-$C_4$alkyl radicals $R_9$ and $R_{10}$ is substituted by cyano or by acyloxy; and (C) at least one dye of the formula (3) wherein $R_{11}$ is fluoro, trifluoromethyl, trifluoromethoxy, trifluoromethylsulfonyl or cyano, $R_{12}$ and $R_{13}$ each independently of the other represent hydrogen, $C_1$-$C_{12}$alkyl, $C_1$-$C_{12}$alkoxy, halogen, cyano, nitro, trifluoromethyl or —CO—$OR_{16}$, wherein $R_{16}$ is $C_1$-$C_{12}$alkyl unsubstituted or substituted by one or more $C_1$-$C_{12}$alkoxy, hydroxy, amino or halogen, and one of the radicals $R_{14}$ and $R_{15}$ denotes hydrogen or $CrC6$alkyl unsubstituted or substituted by hydroxy, $C_1$-$C_4$acyloxy, $C_1$-$C_6$alkoxy, $C_1$-$C_4$acyloxy-$C_1$-$C_6$alkoxy or hydroxy-$C_1$-$C_6$alkoxy, and the other one of the radicals $R_{14}$ and $R_{15}$ denotes $C_1$-$C_6$alkyl unsubstituted or substituted by phenoxy-$C_1$-$C_6$alkoxy, or phenyl that is unsubstituted or substituted by one or more substituents from the group $C_1$-$C_{12}$alkyl, $C_1$-$C_{12}$alkoxy and trifluoromethyl; and to an ink-jet printing process for printing semi-synthetic or synthetic hydrophobic textile fiber materials with the said aqueous inks, wherein the prints obtained have high temperature light fastness and at the same time a high color strength.

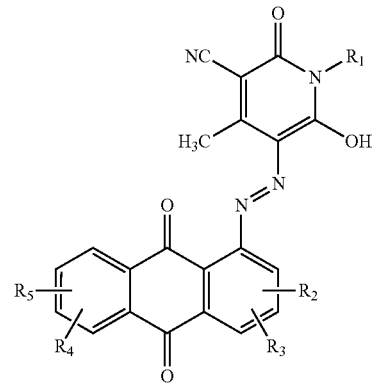

(1)

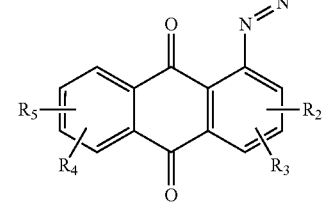

(2)

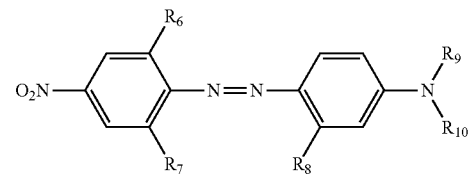

(3)

8 Claims, No Drawings

INKS AND A PROCESS FOR INK-JET PRINTING TEXTILE FIBRE MATERIALS

CROSS REFERENCE TO RELATED APPLICATION

This application is the National Phase of International Application PCT/EP2013/066809 filed Aug. 12, 2013, which designated the U.S. and which claims priority to European Patent Application (EP)12006399.5 filed Sep. 20, 2012. The noted application are incorporated herein by reference.

The present invention relates to aqueous inks comprising a mixture of disperse dyestuffs and to a process for printing semi-synthetic or synthetic hydrophobic textile fibre materials with the said inks by the ink-jet printing process.

Ink-jet printing inks and processes have already been used for some years in the textile industry. They make it possible to do without the otherwise customary production of a printing stencil, so enabling considerable savings to be made in both cost and time. In connection with the production of originals, in particular, it is possible to respond to changes within a much shorter time.

Appropriate ink-jet printing inks should in particular have optimum performance characteristics. In this context mention may be made of characteristics such as viscosity, stability, surface tension and conductivity of the inks that are used. In addition, heightened requirements are placed on the quality of the resulting prints, in terms, for example, of colour strength, fibre-dye bond stability, and wet fastness properties. It has been shown, however, that such inks do not always fully satisfy the highest demands, especially in respect of high temperature light fastness and colour strength of the prints prepared with such inks. There is therefore a need for new aqueous inks that yield tinctorially strong prints, in particular black prints, having at the same time high temperature light fastness and that exhibit good allround fastness properties. Aqueous printing inks having superior properties in these respects are required, in particular, in automotive industry for car interior lining and seat covers, but also for other applications such as outdoor and for flags and banners.

The present invention accordingly relates to aqueous inks comprising
(A) at least one dye of the formula

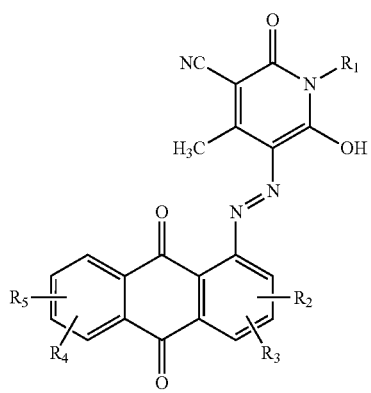

(1)

wherein
$R_1$ is $C_1$-$C_{12}$alkyl, or $C_2$-$C_{12}$alkyl interrupted by one or more oxygen atoms and/or —COO— groups, and
$R_2$, $R_3$, $R_4$ and $R_5$ each independently of the others is hydrogen, $C_1$-$C_{12}$alkyl, chlorine, bromine, hydroxy or amino;

(B) at least one dye of the formula

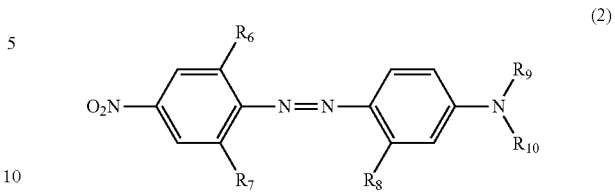

(2)

wherein
$R_6$ is hydrogen, bromine, chlorine or cyano,
$R_7$ is trifluoromethyl, bromine or chlorine,
$R_8$ is hydrogen, methyl or acetylamino,
$R_9$ and $R_{10}$ each independently of the other is $C_1$-$C_4$alkyl unsubstituted or substituted by cyano or by acyloxy, one of the $C_1$-$C_4$alkyl radicals $R_9$ and $R_{10}$ is substituted by cyano or by acyloxy; and
(C) at least one dye of the formula

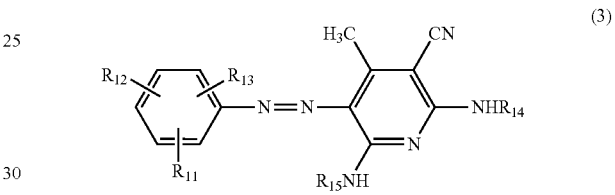

(3)

wherein
$R_{11}$ is fluoro, trifluoromethyl, trifluoromethoxy, trifluoromethylsulfonyl or cyano,
$R_{12}$ and $R_{13}$ each independently of the other represent hydrogen, $C_1$-$C_{12}$alkyl, $C_1$-$C_{12}$alkoxy, halogen, cyano, nitro, trifluoromethyl or —COOR$_{16}$, wherein $R_{16}$ is $C_1$-$C_{12}$alkyl unsubstituted or substituted by one or more $C_1$-$C_{12}$alkoxy, hydroxy, amino or halogen, and one of the radicals $R_{14}$ and $R_{15}$ denotes hydrogen or $C_1$-$C_6$alkyl unsubstituted or substituted by hydroxy, $C_1$-$C_4$acyloxy, $C_1$-$C_6$alkoxy, $C_1$-$C_4$acyloxy-$C_1$-$C_6$alkoxy or hydroxy-$C_1$-$C_6$alkoxy, and the other one of the radicals $R_{14}$ and $R_{15}$ denotes $C_1$-$C_6$alkyl unsubstituted or substituted by phenoxy-$C_1$-$C_6$alkoxy, or phenyl that is unsubstituted or substituted by one or more substituents from the group $C_1$-$C_{12}$alkyl, $C_1$-$C_{12}$alkoxy and trifluoromethyl.

In another embodiment the aqueous inks comprising dyestuff components (A), (B) and (C) indicated above further comprise
(D) at least one dye of the formula

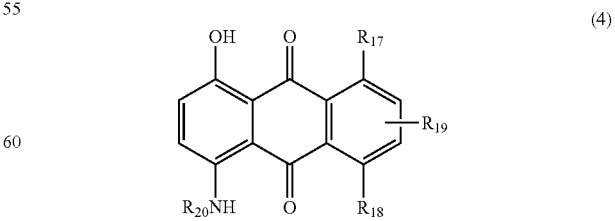

(4)

wherein
one of the radicals $R_{17}$ and $R_{18}$ denotes hydroxy and the other one of the radicals $R_{17}$ and $R_{18}$ denotes amino or nitro, $R_{19}$ is hydrogen or phenyl unsubstituted or substituted by one or more substituents from the group hydroxy and $C_1$-$C_6$alkoxy, and $R_{20}$ denotes hydrogen or phenyl that is unsubstituted or substituted by one or more substituents from the group hydroxy, halogen, $C_1$-$C_6$alkoxy or $C_1$-$C_6$alkyl unsubstituted or substituted by hydroxy.

$R_1$ in the meaning of $C_2$-$C_{12}$alkyl interrupted by one or more oxygen atoms and/or —COO— groups is, for example, 2-methoxyethyl, 2-ethoxyethyl, 2-(2-ethoxyethoxy)ethyl, —CH$_2$CH$_2$OCH$_2$CH$_2$OCH$_3$, —CH$_2$CH$_2$OCH$_2$CH$_2$OCH$_2$CH$_2$OCH$_3$, —CH$_2$CH$_2$OCH$_2$CH$_2$OCH$_2$CH$_2$OC$_2$H$_5$, —CH$_2$CH$_2$COOCH$_3$, —CH$_2$CH$_2$COOC$_2$H$_5$, —CH$_2$CH$_2$CH$_2$CH$_2$COOCH$_3$, —CH$_2$CH$_2$CH$_2$CH$_2$COOC$_2$H$_5$, —CH$_2$CH$_2$OCH$_2$CH$_2$COOCH$_3$ or —CH$_2$CH$_2$OCH$_2$CH$_2$COOC$_2$H$_5$.

$R_1$, $R_2$, $R_3$, $R_4$, $R_5$, $R_{12}$, $R_{13}$, $R_{14}$, $R_{15}$ and $R_{16}$ each in the meaning of $C_1$-$C_{12}$alkyl, or any of $C_1$-$C_{12}$alkyl bound to $R_{14}$ and $R_{15}$ in the meaning of phenyl may be straight-chain or branched. Examples of alkyl groups are methyl, ethyl, n-propyl, isopropyl, n-butyl, isobutyl, sec-butyl, tert-butyl, n-pentyl, neopentyl, n-hexyl, n-heptyl, n-octyl, isooctyl, 2-ethylhexyl, n-decyl and n-dodecyl.

$R_9$ and $R_{10}$ each in the meaning of $C_1$-$C_4$alkyl may be straight-chain or branched, for example, methyl, ethyl, n-propyl, isopropyl, n-butyl, isobutyl, sec-butyl and tert-butyl, at least one of the $C_1$-$C_4$alkyl radicals $R_9$ and $R_{10}$ is substituted by cyano or by acyloxy, for example, acetyloxy or propionyloxy, preferably, acetyloxy.

$R_{12}$ and $R_{13}$ each in the meaning of $C_1$-$C_{12}$alkoxy, or any of $C_1$-$C_{12}$alkoxy bound to $R_{14}$ and $R_{15}$ in the meaning of phenyl may be straight-chain or branched. Examples of alkoxy groups are methoxy, ethoxy, n-propoxy, isopropoxy, n-butoxy, isobutoxy, sec-butoxy, tert-butoxy, n-pentyloxy, neopentyloxy, n-hexyloxy, n-heptyloxy, n-octyloxy, isooctyloxy, n-decyloxy and n-dodecyloxy.

$R_{12}$ and $R_{13}$ each in the meaning of halogen substituents are, for example, fluorine, chlorine or bromine, and especially chlorine or bromine.

$R_{14}$ and $R_{15}$ each in the meaning of $C_1$-$C_6$alkyl may be unsubstituted or substituted by hydroxy, $C_1$-$C_4$acyloxy, $C_1$-$C_6$alkoxy, $C_1$-$C_4$acyloxy-$C_1$-$C_6$alkoxy, hydroxy-$C_1$-$C_6$alkoxy or phenoxy-$C_1$-$C_6$alkoxy. Substituted alkyl groups are, for example, 2-hydroxyethyl, 2-hydroxypropyl, —(CH$_2$)$_2$—O—(CH$_2$)$_2$—OH, —(CH$_2$)$_3$—O—(CH$_2$)$_4$—OH, —(CH$_2$)$_2$—O-acyl, —(CH$_2$)$_3$—O-acyl, —CH$_2$—CH(CH$_3$)—O-acyl, —(CH$_2$)$_6$—O-acyl, —(CH$_2$)$_2$—O—(CH$_2$)$_2$—O-acyl, —(CH$_2$)$_3$—O—(CH$_2$)$_4$—O-acyl, —(CH$_2$)$_2$—O—(CH$_2$)$_2$—O-phenyl, —(CH$_2$)$_3$—O—(CH$_2$)$_2$—O-phenyl, —(CH$_2$)$_3$—O—(CH$_2$)$_4$—O-phenyl, 2-methoxyethyl, 3-methoxypropyl, 2-ethoxyethyl and 3-ethoxypropyl; acyl meaning, for example, formyl, acetyl or propionyl; and phenyl meaning $C_6H_5$.

$R_{16}$ in the meaning of $C_1$-$C_{12}$alkyl may be unsubstituted or substituted by one or more $C_1$-$C_{12}$alkoxy-, hydroxy-, amino- or halogen-radicals. Substituted alkyl groups are, for example, 2-hydroxyethyl, 2-hydroxypropyl, 4-hydroxybutyl, 2-aminoethyl, 2-aminopropyl, 4-aminobutyl, 2-chloroethyl, 2-bromoethyl, 4-chlorobutyl, 2-methoxyethyl, 3-methoxypropyl, 2-ethoxyethyl and 3-ethoxypropyl.

$C_1$-$C_6$alkyl bound to $R_{20}$ in the meaning of phenyl is, for example, methyl, ethyl, n-propyl, isopropyl, n-butyl, isobutyl, sec-butyl, tert-butyl, n-pentyl, neopentyl or n-hexyl, each of which is unsubstituted or substituted by hydroxy.

$C_1$-$C_6$alkoxy bound to $R_{19}$ and $R_{20}$ in the meaning of phenyl is, for example, methoxy, ethoxy, n-propoxy, isopropoxy, n-butoxy, isobutoxy, sec-butoxy, tert-butoxy, n-pentyloxy, neopentyloxy or n-hexyloxy.

Halogen bound to $R_{20}$ in the meaning of phenyl is, for example, fluorine, chlorine or bromine, and especially chlorine or bromine.

Preferably, $R_1$ is ethyl, n-propyl, n-butyl, isobutyl, n-hexyl, 2-ethylhexyl or 3-isopropoxypropyl, and especially n-propyl, n-butyl, isobutyl or n-hexyl.

Preferably, $R_2$ and $R_3$ are identical and are each hydrogen, chlorine or bromine.

Preferably, $R_4$ and $R_5$ each independently of the other represent hydrogen or chlorine.

In a particular embodiment, $R_2$, $R_3$, $R_4$ and $R_5$ are each hydrogen.

Preference is given to inks that comprise, as dyestuff component (A), at least one dye of formula (1), wherein $R_1$ is ethyl, n-propyl, n-butyl, isobutyl, n-hexyl, 2-ethylhexyl or 3-isopropoxypropyl and $R_2$, $R_3$, $R_4$ and $R_5$ are as defined and preferred hereinabove and, especially, each of $R_2$, $R_3$, $R_4$ and $R_5$ is hydrogen.

Preferably, $R_6$ is bromine, chlorine or cyano, especially bromine or chlorine, and more especially bromine.

Preferably, $R_7$ is trifluoromethyl or chlorine, and especially trifluoromethyl.

Preferably, $R_8$ is hydrogen or acetylamino, and especially hydrogen.

Preferably, $R_9$ is cyanoethyl.

Preferably, $R_{10}$ is cyanoethyl.

Preference is given to inks that comprise, as dyestuff component (B), at least one dye of formula (2) wherein $R_6$ is bromine or chlorine, and more especially bromine, $R_7$ is trifluoromethyl or chlorine, and especially trifluoromethyl, $R_8$ is hydrogen or acetylamino, and especially hydrogen, and $R_9$ and $R_{10}$ are cyanoethyl.

Preferably, $R_{11}$ is fluoro, trifluoromethyl or cyano, especially trifluoromethyl or cyano, and more especially trifluoromethyl.

Preferably, $R_{12}$ and $R_{13}$ each independently of the other represent hydrogen, fluoro, chloro, bromo, cyano or nitro, especially hydrogen or nitro.

Preferably, one of the radicals $R_{14}$ and $R_{15}$ denotes hydrogen or $C_1$-$C_6$alkyl unsubstituted or substituted by hydroxy or hydroxy-$C_1$-$C_6$alkoxy, and the other one of the radicals $R_{14}$ and $R_{15}$ denotes $C_1$-$C_5$alkyl unsubstituted or substituted by phenoxy-$C_1$-$C_6$alkoxy, or phenyl that is unsubstituted or substituted by one or more substituents from the group trifluoromethyl, n-propyl, n-butyl and n-butoxy.

Especially, one of the radicals $R_{14}$ and $R_{15}$ denotes hydrogen, 2-hydroxyethyl or the radical of formula —(CH$_2$)$_2$—O—(CH$_2$)$_2$—OH, and the other one of the radicals $R_{14}$ and $R_{15}$ denotes the radical of formula —(CH$_2$)$_3$—O—(CH$_2$)$_2$—O-phenyl, or phenyl that is unsubstituted or substituted by one or more substituents from the group trifluoromethyl, n-propyl, n-butyl and n-butoxy, and more especially one of the radicals $R_{14}$ and $R_{15}$ denotes hydrogen, and the other one of the radicals $R_{14}$ and $R_{15}$ denotes phenyl.

Preference is given to inks, wherein the dye of formula (3) is represented by a dye of formula

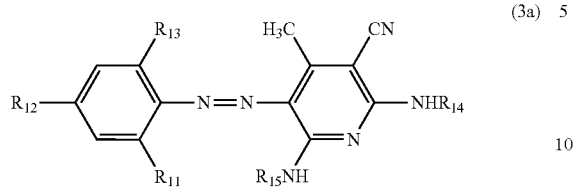
(3a)

wherein
the radicals $R_{11}$, $R_{12}$, $R_{13}$, $R_{14}$ and $R_{15}$ have the meanings and preferred meanings given above.

Preference is given to inks that comprise, as dyestuff component (C), at least one dye of formula (3a), wherein
$R_{11}$ is trifluoromethyl or cyano,
$R_{12}$ and $R_{13}$ each independently of the other represent hydrogen, fluoro, chloro, bromo, cyano or nitro, especially hydrogen or nitro,
one of the radicals $R_{14}$ and $R_{15}$ denotes hydrogen, 2-hydroxyethyl or the radical of formula —$(CH_2)_2$—O—$(CH_2)_2$—OH, and the other one of the radicals $R_{14}$ and $R_{15}$ denotes the radical of formula —$(CH_2)_3$—O—$(CH_2)_2$—O-phenyl, or phenyl that is unsubstituted or substituted by one or more substituents from the group trifluoromethyl, n-propyl, n-butyl and n-butoxy, and more especially one of the radicals $R_{14}$ and $R_{15}$ denotes hydrogen, and the other one of the radicals $R_{14}$ and $R_{15}$ denotes phenyl.

Suitable dyestuff components (A) are, for example, the dyes of formulae (101) to (127):

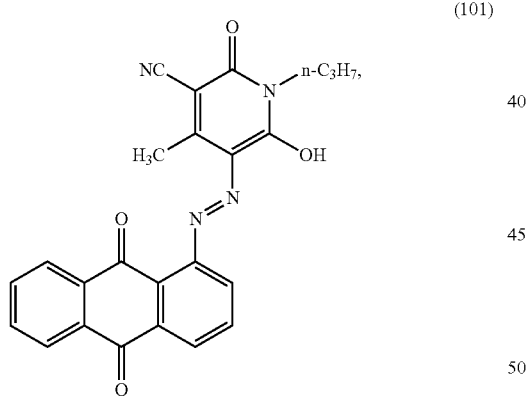
(101)

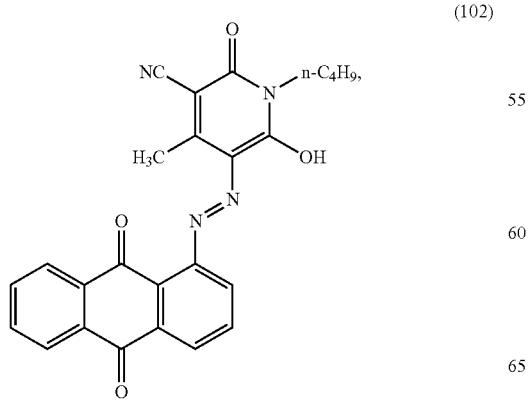
(102)

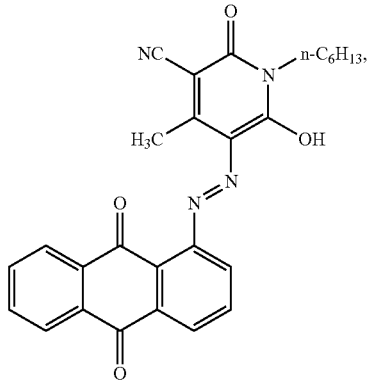
(103)

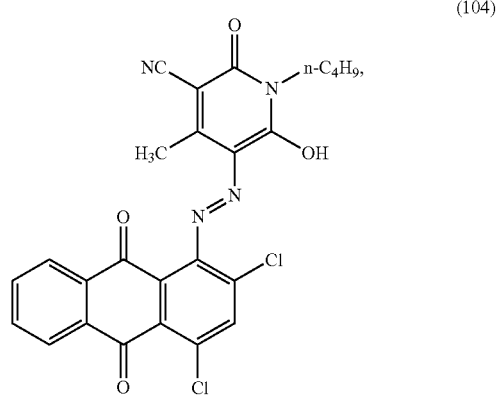
(104)

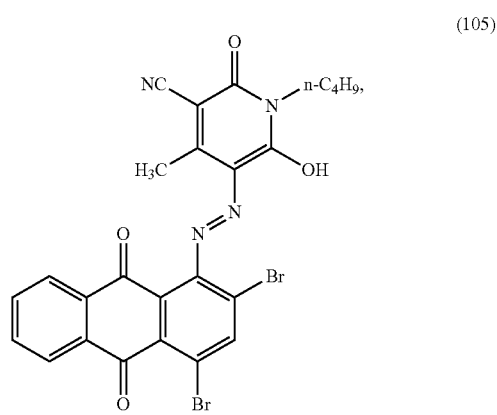
(105)

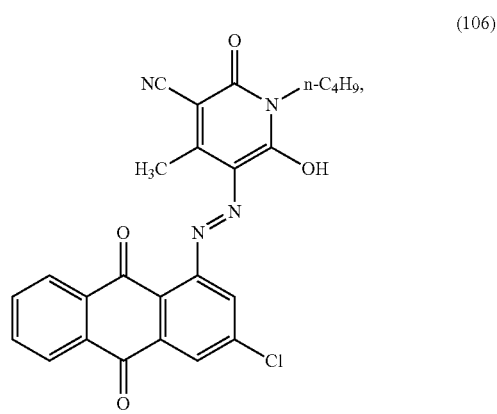
(106)

(107)
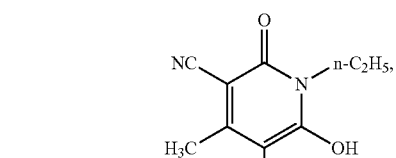
(108)
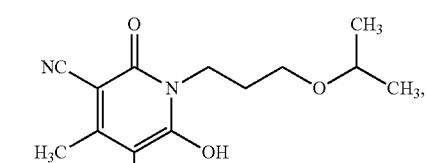
(109)
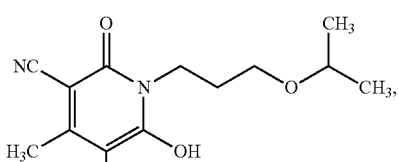
(110)
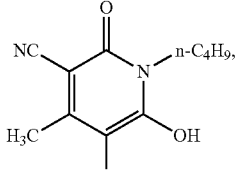
(111)
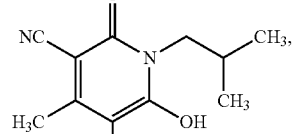
(112)
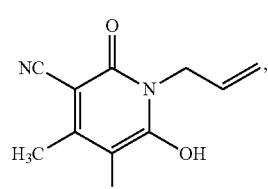
(113)
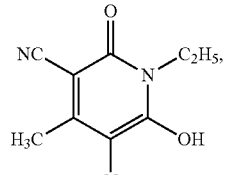
(114)
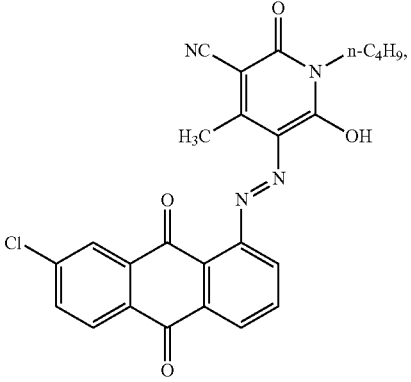

-continued
(115)
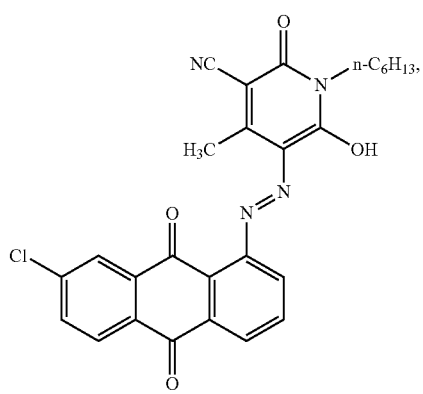
(116)
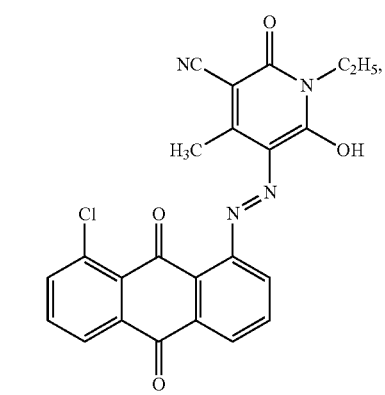
(117)
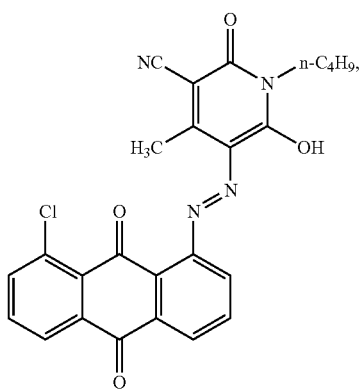
(118)
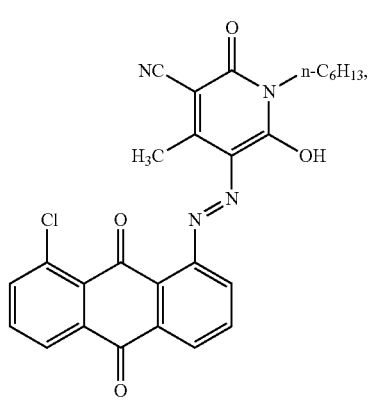
-continued
(119)
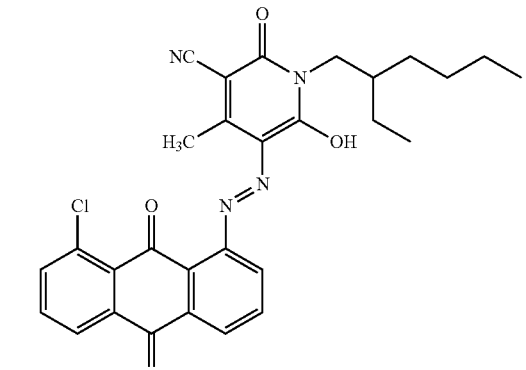
(120)
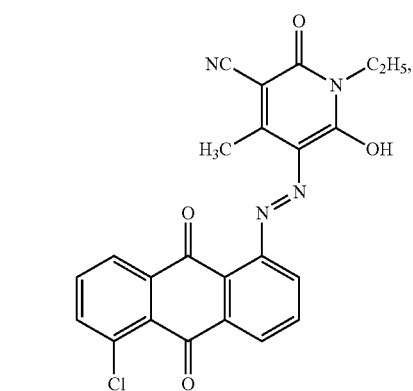
(121)
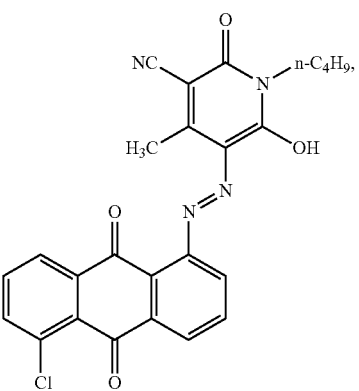
(122)
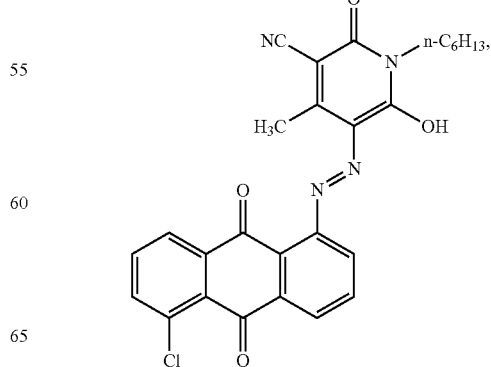

(123)

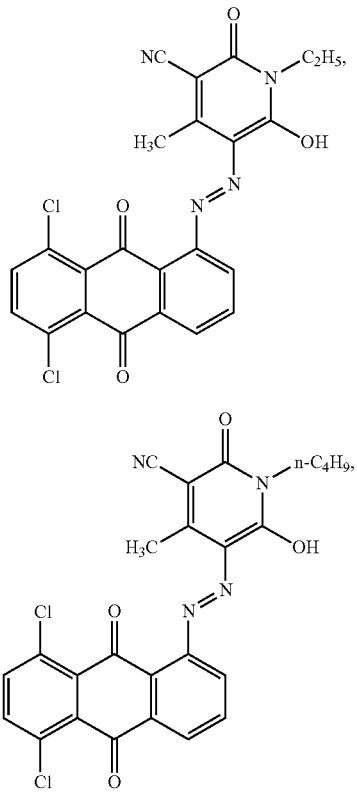

(124)

(125)

(126)

(127)

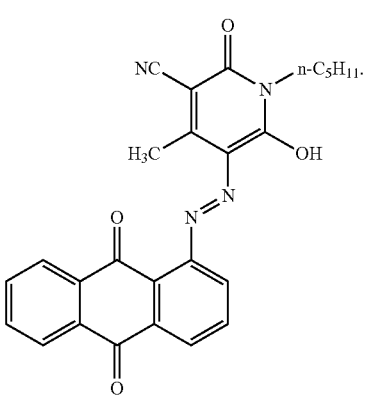

The inks according to the invention comprise, as dyestuff component (A), preferably two or three, and especially three different dyes of formula (1), for example, the dyes of formulae (101), (102) and/or (103)

The dyes of formula (1) are known per se, or they can be prepared in analogy to known compounds. The dyes of formula (1) are described, for example, in EP-A-43937 and U.S. Pat. No. 7,544,217.

Suitable dyestuff components (B) are, for example, the dyes of formulae (201) to (211):

(201)

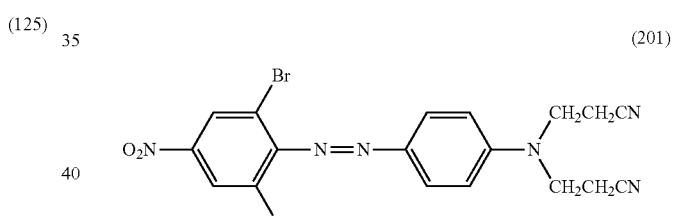

(202)

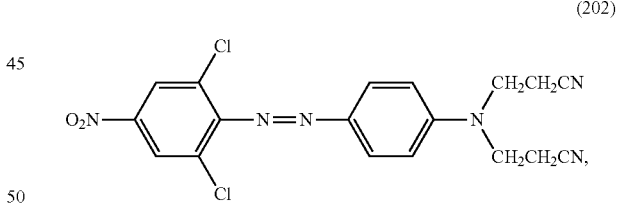

(203)

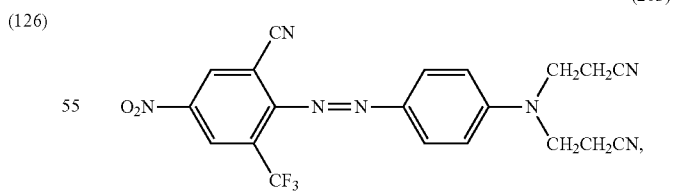

(204)

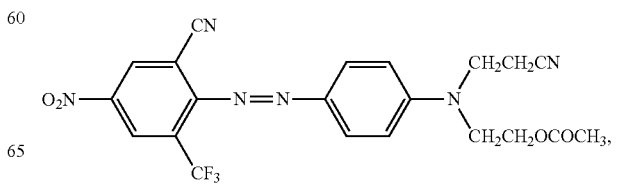

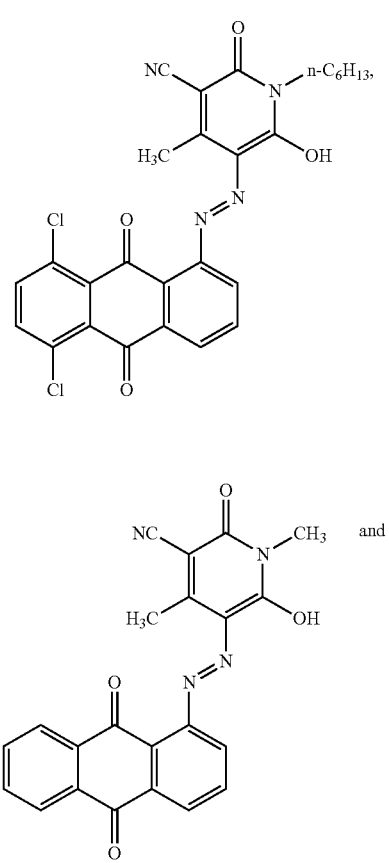

and

The inks according to the invention comprise as dyestuff component (B), for example, the dye of formulae (201) or (202).

The dyes of formula (2) are known per se, or they can be prepared in analogy to known compounds. The dyes of formula (2) are described, for example, in U.S. Pat. No. 6,540,794.

Suitable dyestuff components (C) are, for example, the dyes of formulae (301) to (325):

-continued
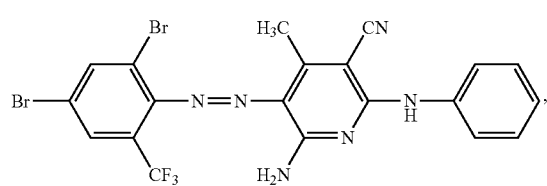
(308)
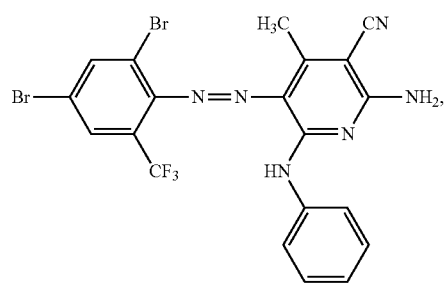
(309)
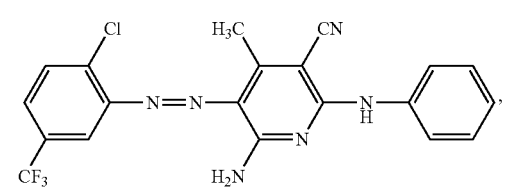
(310)
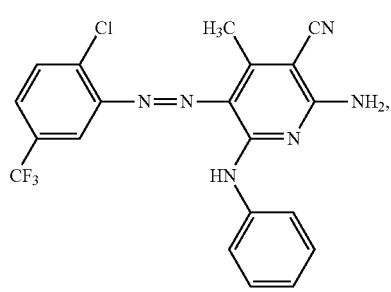
(311)
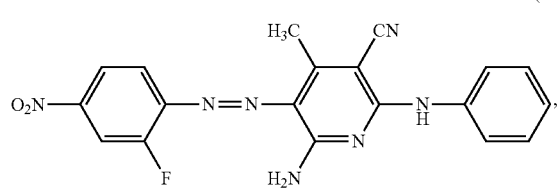
(312)
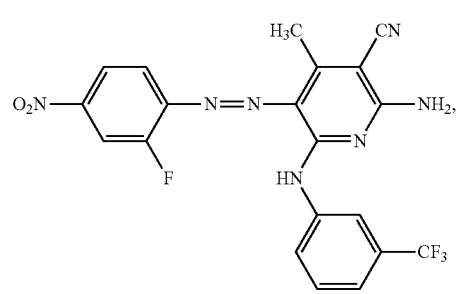
(313)
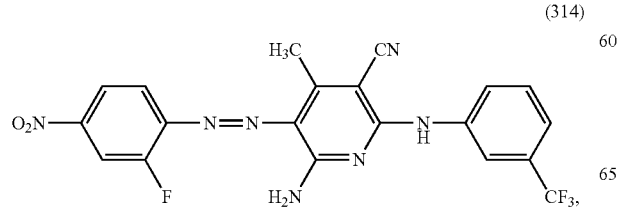
(314)
-continued
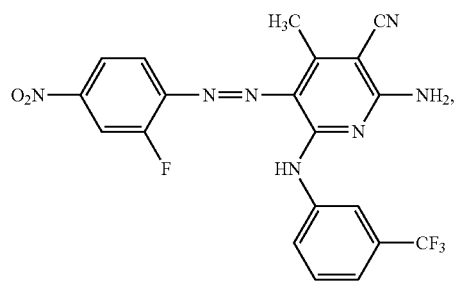
(315)
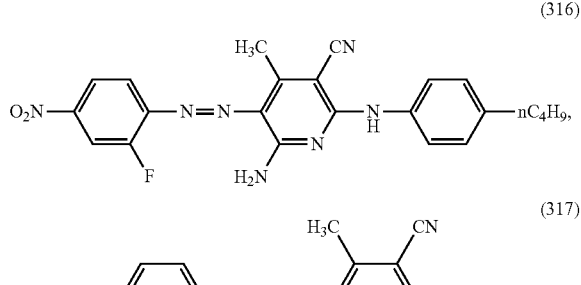
(316)
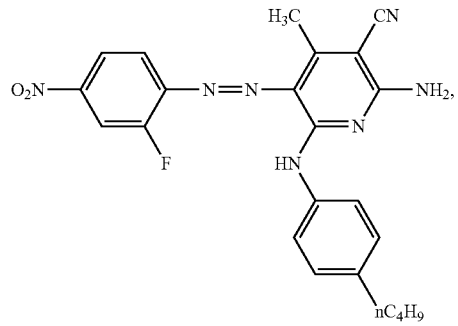
(317)
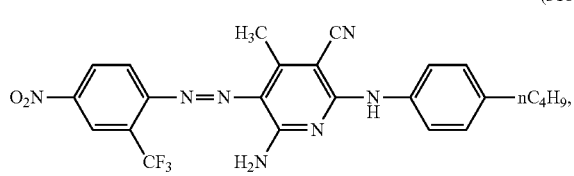
(318)
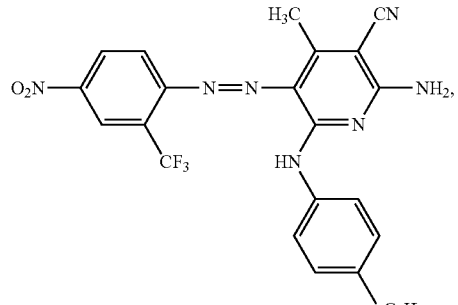
(319)
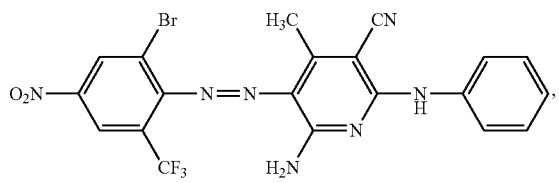
(320)

-continued

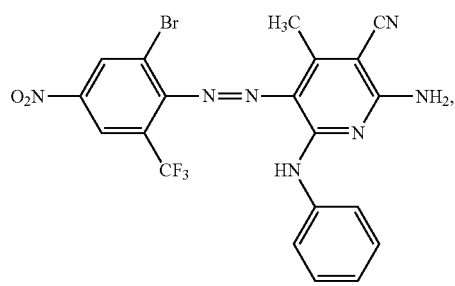
(321)

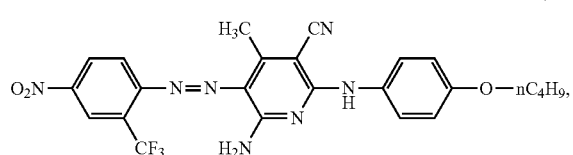
(322)

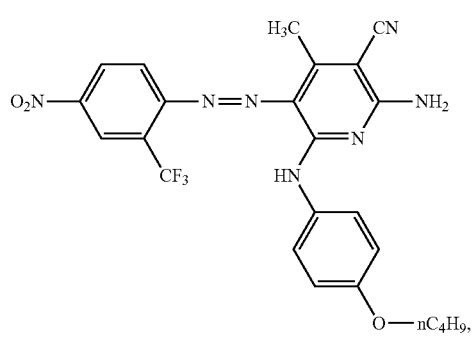
(323)

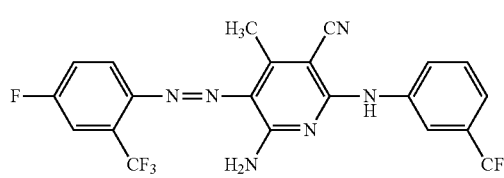
(324)

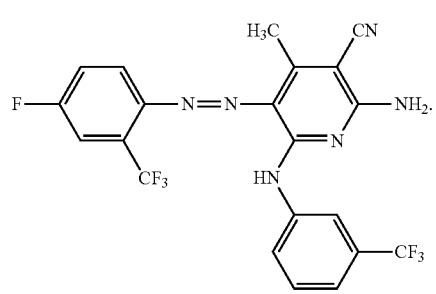
(325)

The inks according to the invention comprise as dyestuff component (C), for example, the dyes of formulae (301) and/or (302), or the dyes of formulae (303) and/or (304).

The inks according to the invention comprise as dyestuff component (C) two different dyes of formula (3), for example, the dyes of formulae (301) and (302), or the dyes of formulae (303) and (304).

The dyes of formula (3) are known per se, or they can be prepared in analogy to known compounds. The dyes of formula (3) are described, for example, in WO-A-2012/084417.

Suitable dyestuff components (D) are, for example, the compounds of formulae (401) to (406):

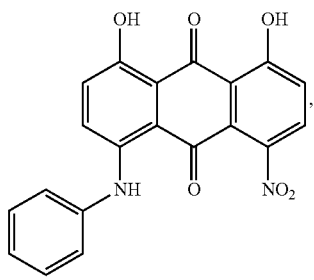
(401)

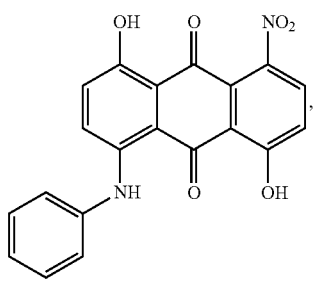
(402)

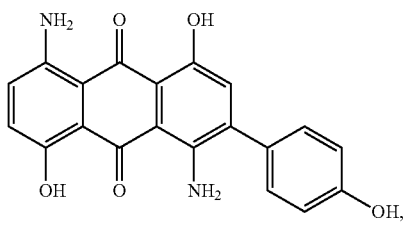
(403)

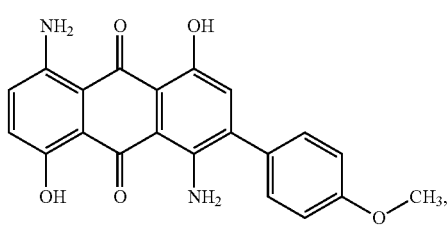
(404)

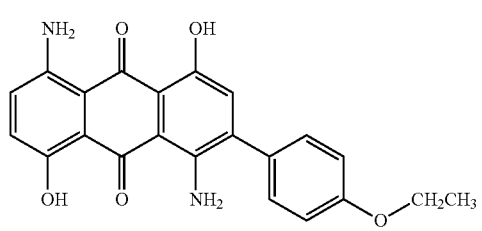
(405)

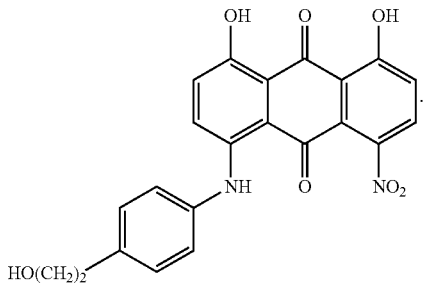
(406)

In some embodiments, the aqueous inks comprise as dyestuff component (D) the dyes of formulae (401) and (402), the dyes of formulae (403) and (404), or the dyes of formulae (403) and (405), and preferably the dyes of formulae (401) and (402).

The dyes of formula (4) are known per se, or they can be prepared in analogy to known compounds.

The inks according to the present invention may comprise one or more further dyestuff components, for example, one or two dyestuff components, to adjust the color shade or other properties. Such suitable dyestuff components are, for example, the dyes of the formulae

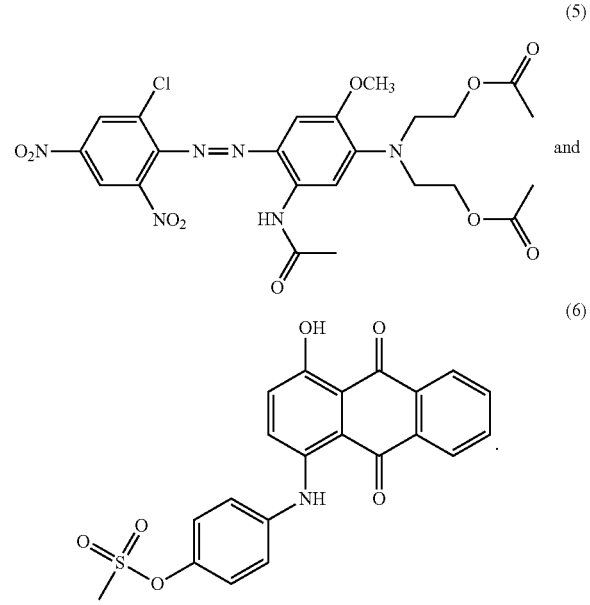

The dyes of formula (5) and (6) are known per se, or they can be prepared in analogy to known compounds.

The inks generally have an overall content of disperse dyestuffs of from 1 to 20% by weight, in particular from 1 to 10% by weight and, above all, from 1 to 8% by weight, based on the overall weight of the ink composition.

The content of each disperse dyestuff depends on the desired color shade. Suitable black or grey inks comprise, for example,
0.70 to 1.00% by weight of dyestuff component (A),
0.85 to 1.15% by weight of dyestuff component (B),
1.10 to 1.50% by weight of dyestuff component (C) and
3.15 to 4.35% by weight of dyestuff component (D),
based on the overall weight of the disperse dyestuffs in the ink composition.

Within the inks of the invention the disperse dyes are advantageously in a finely dispersed form. For this purpose the disperse dyes are milled to an average particle size of between 0.1 and 10 microns, preferably between 1 and 5 microns and, with particular preference, between 0.5 and 2 microns. Milling can be carried out in the presence of dispersants. For example, the dried disperse dye is milled with a dispersant or kneaded in paste form with a dispersant and, if desired, is dried under reduced pressure or by spraying. The resulting preparations can be used to prepare the inks of the invention by addition of water and, if desired, of further auxiliaries.

Suitable dispersants are anionic dispersants from the group consisting of
(a) acidic esters or their salts of alkylene oxide adducts of the formula

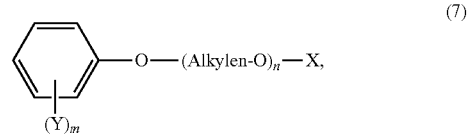

in which
X is the acid radical of an inorganic, oxygen-containing acid, such as sulfuric or, preferably, phosphoric acid, or else the radical of an organic acid,
Y is $C_1$-$C_{12}$alkyl, aryl or aralkyl, "Alkylen" is the ethylene radical or propylene radical, and
m is from 1 to 4 and n is from 4 to 50,
(b) polystyrenesulfonates,
(c) fatty acid taurides,
(d) alkylated diphenyl oxide mono- or disulfonates,
(e) sulfonates of polycarboxylic esters,
(f) an adduct of from 1 to 60, preferably from 2 to 30, mol of ethylene oxide and/or propylene oxide with fatty amines, fatty amides, fatty acids or fatty alcohols each having 8 to 22 carbon atoms or with trihydric to hexahydric alkanols having 3 to 6 carbon atoms, the said adduct being converted into an acidic ester with an organic dicarboxylic acid or with an inorganic polybasic acid,
(g) ligninsulfonates,
(h) naphthalenesulfonates, and
(i) formaldehyde condensates.

As ligninsulfonates (g) use is made primarily of those ligninsulfonates, or their alkali metal salts, whose content of sulfo groups does not exceed 25% by weight. Preferred ligninsulfonates are those having a content of from 5 to 15% by weight of sulfo groups. Examples of suitable formaldehyde condensates (i) are condensates of ligninsulfonates and/or phenol and formaldehyde, condensates of formaldehyde with aromatic sulfonic acids, such as condensates of ditolyl ether sulfonates and formaldehyde, condensates of naphthalenesulfonic acid with formaldehyde and/or of naphthol- or naphthylaminosulfonic acids with formaldehyde, condensates of phenolsulfonic acids and/or sulfonated dihydroxydiphenyl sulfone and phenols or cresols with formaldehyde and/or urea, and condensates of diphenyl oxide disulfonic acid derivatives with formaldehyde. Interesting products (i) are condensates of ditolyl ether sulfonates and formaldehyde, as described for example in U.S. Pat. No. 4,386,037, condensates of phenol and formaldehyde with ligninsulfonates, as described for example in U.S. Pat. No. 3,931,072, condensates of 2-naphthol-6-sulfonic acid, cresol, sodium bisulfite and formaldehyde [cf. FIAT Report 1013 (1946)], and condensates of diphenyl derivatives and formaldehyde, as described for example in U.S. Pat. No. 4,202,838.

In one embodiment compound (i) is the compound of the formula

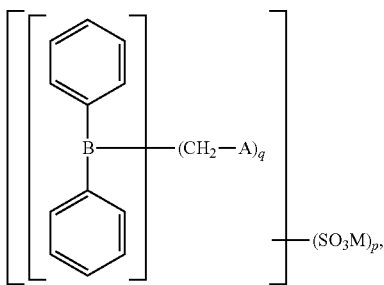

(8)

in which
B is a direct bond or oxygen,
A is the radical of an aromatic compound and is attached to the methylene group by a ring carbon atom,
M is hydrogen or a salt-forming cation, such as an alkali metal, alkaline earth metal or ammonium, and
q and p independently of one another are a number from 1 to 4.

In another embodiment compound (i) is a compound based on the sulfonated condensate of a chloromethylbiphenyl isomer mixture and naphthalene, of the formula

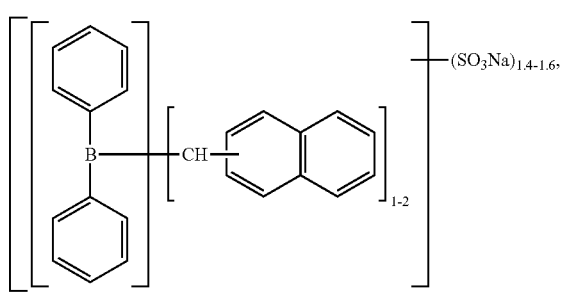

(9)

in which $(SO_3Na)_{1.4-1.6}$ denotes an average degree of sulfonation of from 1.4 to 1.6.

The above dispersants are known and commercially available, or can be prepared in analogy to known compounds by widely known processes.

Apart from the disperse dyes and the dispersants, the inks may include thickeners to adjust the viscosity. There come into consideration thickeners of natural or synthetic origin, examples being commercial alginate thickeners, starch ethers or locust bean gum ethers, especially sodium alginate on its own or in a mixture with modified cellulose, in particular with preferably from 20 to 25 percent by weight of carboxymethylcellulose.

In the inks of the invention, preference is given to the use of synthetic thickeners such as those based on poly(meth)acrylic acids or poly(meth)acrylamides.

For the process of the invention, preference is given to inks having a viscosity of from 1 to 40 mPa·s (millipascal seconds), in particular from 1 to 20 mPa·s and, above all, from 1 to 10 mPa·s.

The inks may also include buffer substances, such as borax, borate or citrate. Examples are borax, sodium borate, sodium tetraborate, and sodium citrate. They are used in particular in amounts of from 0.1 to 3% by weight, especially from 0.1 to 1% by weight, based on the overall weight of the ink, so as to give a pH of, for example, from 4 to 10, preferably from 5 to 8.

Further additives which may be present in the inks are surfactants, redispersants and humectants.

Suitable surfactants include commercially available anionic or non-ionic surfactants. Betaine monohydrate may be mentioned as an example of a redispersant. As the humectant it is preferred to use a mixture of sodium lactate (advantageously in the form of an aqueous solution with a strength of from 50 to 60%) and glycerol and/or propylene glycol in amounts from 0.1 to 40% by weight, especially from 2 to 35% by weight, based on the overall weight of the ink composition.

If desired, the inks may also include acid donors, such as butyrolactone or sodium hydrogen phosphate, preservatives, substances which inhibit bacterial and/or fungal growth, foam suppressants, sequestrants, emulsifiers, water-insoluble solvents, oxidizing agents, or degassing agents.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)-benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one. A suitable preservative is, for example, a 20% by weight solution of 1,2-benzisothiazolin-3-one in dipropylene glycol (Proxel® GXL).

Suitable sequestrants are, for example, sodium nitrilotriacetate, sodium ethylenediamine-tetraacetate and, in particular, sodium polymetaphosphate, especially sodium hexametaphosphate.

Suitable emulsifiers are, in particular, adducts of an alkylene oxide and a fatty alcohol, especially an adduct of oleyl alcohol and ethylene oxide.

Suitable water-insoluble solvents are high-boiling saturated hydrocarbons, especially paraffins having a boiling range from about 160 to 210° C. (known as paint and varnish maker's naphthas).

A suitable oxidizing agent is, for example, an aromatic nitro compound, especially an aromatic mono- or dinitrocarboxylic or -sulfonic acid, which may be in the form of an alkylene oxide adduct, especially a nitrobenzenesulfonic acid.

Suitable degassing agents are, for example, high-boiling solvents, especially turpentine oils, higher alcohols, preferably $C_8$ to $C_{10}$ alcohols, terpene alcohols or degassing agents based on mineral oils and/or silicone oils, especially commercial formulations composed of from about 15 to 25% by weight of a mineral and silicone oil mixture and from about 75 to 85% by weight of a $C_8$ alcohol such as 2-ethyl-n-hexanol.

The inks can be prepared in customary manner by mixing the individual constituents in the desired amount of water.

The inks are prepared, for example, by stirring the disperse dyestuff components with a dispersant and milling the resulting mixture in a wet mill to a defined degree of milling corresponding to an average particle size of from 0.2 to 1.0 µm. Subsequently, the concentrated millbase—with or without the use of, for example, appropriate thickeners, dispersants, copolymers, surfactants, humectants, redispersants, sequestrants and/or preservatives, and also water—is adjusted to the desired concentration. To remove any coarse fractions present it is possible with advantage to carry out filtration of the ready-to-use ink through a microsieve of about 1 µm.

The process of the invention for printing textile fibre materials can be implemented with ink-jet printers which are known per se and are suitable for textile printing.

In the ink-jet printing process, individual drops of the ink are sprayed from a nozzle onto the substrate in a controlled manner. The methods used in this context are predominantly the continuous ink-jet method and the drop-on-demand method. In the case of the continuous ink-jet method the drops are generated continuously, with the drops that are not required for printing being diverted into a collecting vessel and, in general, recycled. In the case of the drop-on-demand method, on the other hand, the drops are generated and used for printing when desired; in other words, drops are only generated when required for printing. Generation of the drops can be carried out advantageously, for example, by means of a piezoelectric ink-jet head or by means of thermal energy (referred to as bubble jet). For the process of the invention, preference is given to printing by the continuous ink-jet method or by the drop-on-demand method.

After printing, the fibre material is dried at temperatures of up to 150° C., preferably from 80 to 120° C.

The subsequent fixing of the fibre material takes place in general by means of dry heat (thermofixing) or by means of superheated steam under atmospheric pressure (HT fixing). Fixing is carried out under the following conditions:

Thermofixing: from 1 to 2 minutes at from 190 to 230° C.;
HT fixing: from 4 to 9 minutes at from 170 to 190° C.

The inks used in accordance with the invention can be applied to a variety of types of semi-synthetic and, especially, synthetic hydrophobic fibre materials, especially textile materials. Textile materials of fabric blends that comprise such semi-synthetic or synthetic hydrophobic textile materials can likewise be printed using the inks according to the invention.

Semi-synthetic textile materials that come into consideration are especially cellulose 2½acetate and cellulose triacetate.

Synthetic hydrophobic textile materials consist especially of linear, aromatic polyesters, for example polyesters of terephthalic acid or isophthalic acid and glycols, especially ethylene glycol, or condensation products of terephthalic acid and 1,4-bis(hydroxymethyl)cyclo-hexane; of polycarbonates, e.g. polycarbonates obtained from α,α-dimethyl-4,4'-dihydroxy-diphenylmethane and phosgene, and of fibres based on polyvinyl chloride and on polyamide. Suitability also extends to polyester-containing mixed-fibre materials; in other words, to blends of polyester with other fibres, such as polyamide (e.g. nylon, kevlar, nomex, trogamide) and/or of polypropylene.

The present invention accordingly relates also to the use of such inks in an ink-jet printing process for printing semi-synthetic or synthetic hydrophobic textile fibre materials.

Particularly, the inks are used for the printing of polyester fibre materials or fibre materials comprising blends of polyester with other fibres, as given above.

Suitable fibres to be printed by the ink-jet printing process according to the present invention also comprise micofibres of synthetic hydrophobic textile materials, such as micofibres of polyester or polyester-containing mixed-microfibre materials. The term microfibre refers to synthetic fibres that measure less than one denier.

The prints, such as the black and grey prints, obtainable by the process of the present invention have good all-round fastness properties. In particular, the prints have a high colour strength and a high temperature light fastness (e.g. according to VDA 75202 and SAE J1885 as used in automotive industry). The subject matter according to the present invention is useful in automotive industry for designing car interior lining, safety belts and seat covers, but also for the printing of flags and banners, and outdoor and athletic wear, such as cycling jerseys and pants.

The examples which follow serve to illustrate the invention. In these examples the temperatures are in degrees Celsius and parts and percentages are by weight unless specified otherwise. The relationship between parts by weight and parts by volume is that of the kilogram to the liter.

EXAMPLE 1

0.96 parts by weight of a mixture of the disperse dyes of the formulae (101), (102) and (103) in equal parts,
0.90 parts by weight of a disperse dye of the formula (201),
1.38 parts by weight of a disperse dye of the formula (305),
3.86 parts by weight of a mixture of the disperse dyes of the formulae (401) and (402) in equal parts,
0.40 parts by weight of a disperse dye of the formula (5),
0.40 parts by weight of a disperse dye of the formula (6), are stirred with
3.5 parts by weight of a commercial dispersant based on ligninsulfonate,
and the mixture is then milled in a wet mill to an average particle size of from 0.2 to 1.0 µm.

Thereafter the ink, by addition with thorough stirring of
1.0 parts by weight of a commercial surfactant,
0.2 parts by weight of a commercial preservative,
35.0 parts by weight of a commercial humectant and
52.4 parts by weight of deionised water,
is adjusted to a dye content of 7.90% by weight based on the total weight of the ink.

The ink prepared is microfiltered and printed on a polyester fabric and on a polyester microfibre fabric (Alcantara) using an Inkjet printer operating by the drop-on-demand piezo technique. The prints are dried and fixed in superheated steam at 180° C. for 8 minutes. Deep black prints of a high colour strength having good all-round fastness properties, especially high temperature light fastness, are obtained. The high temperature light fastness of the polyester fabric and polyester microfibre fabric according to VDA 75202 is rated 4-5 and 3-4 (Grey Scale), respectively.

Deep black prints of a high colour strength having good all-round fastness properties, especially high temperature light fastness, are likewise obtained if the dried print is fixed with hot air at 200° C. for 1 minute.

EXAMPLE 2

0.72 parts by weight of a disperse dye of the formula (104),
1.06 parts by weight of a disperse dye of the formula (202),
1.22 parts by weight of a mixture of the disperse dyes of the formulae (303) and (304) in equal parts,
3.62 parts by weight of a disperse dye of the formula (401),
0.48 parts by weight of a disperse dye of the formula (5),
0.33 parts by weight of a disperse dye of the formula (6), are stirred with
2.8 parts by weight of a dispersant based on a condensate of phenol and formaldehyde with ligninsulfonate,
and the mixture is then milled in a wet mill to an average particle size of from 0.2 to 1.0 µm.

Thereafter the ink, by addition with thorough stirring of
1.0 parts by weight of a commercial surfactant,
0.2 parts by weight of a commercial preservative, 30.0 parts by weight of a commercial humectant and
58.57 parts by weight of deionised water,
is adjusted to a dye content of 7.43% by weight based on the total weight of the ink.

The ink prepared is microfiltered and printed on a polyester fabric and on a polyester microfibre fabric (Alcantara) using an Inkjet printer operating by the drop-on-demand piezo technique.

The prints are dried and fixed in superheated steam at 180° C. for 8 minutes.

Deep black prints of a high colour strength having good all-round fastness properties, especially high temperature light fastness, are obtained.

Deep black prints of a high colour strength having good all-round fastness properties, especially high temperature light fastness, are likewise obtained if the dried print is fixed with hot air at 200° C. for 1 minute.

EXAMPLE 3

0.86 parts by weight of a mixture of the disperse dyes of the formulae (101), (102) and (103) in equal parts,
0.98 parts by weight of a disperse dye of the formula (201),
1.28 parts by weight of a mixture of the disperse dyes of the formulae (301) and (302) in equal parts,
3.66 parts by weight of a mixture of the disperse dyes of the formulae (401) and (402) in equal parts,
0.41 parts by weight of a disperse dye of the formula (5),
0.39 parts by weight of a disperse dye of the formula (6), are stirred with
3.5 parts by weight of a commercial dispersant based on ligninsulfonate,
and the mixture is then milled in a wet mill to an average particle size of from 0.2 to 1.0 p.m.

Thereafter the ink, by addition with thorough stirring of
1.0 parts by weight of a commercial surfactant,
0.2 parts by weight of a commercial preservative,
35.0 parts by weight of a commercial humectant and
52.72 parts by weight of deionised water,
is adjusted to a dye content of 7.58% by weight based on the total weight of the ink.

The ink prepared is microfiltered and printed on a polyester fabric and on a polyester microfibre fabric (Alcantara) using an Inkjet printer operating by the drop-on-demand piezo technique. The prints are dried and fixed in superheated steam at 180° C. for 8 minutes. Deep black prints of a high colour strength having good all-round fastness properties, especially high temperature light fastness, are obtained. The high temperature light fastness of the polyester fabric and polyester microfibre fabric according to VDA 75202 is rated 4-5 and 3-4 (Grey Scale), respectively.

Deep black prints of a high colour strength having good all-round fastness properties, especially high temperature light fastness, are likewise obtained if the dried print is fixed with hot air at 200° C. for 1 minute.

EXAMPLE 4

20 parts by weight of the ink according to Example 3 are adjusted to a dye content of 1.52% by addition of 80 parts by weight of deionised water. The ink obtained is microfiltered and printed on a polyester microfibre fabric (Alcantara) using an Inkjet printer operating by the drop-on-demand piezo technique. The prints are dried and fixed in superheated steam at 180° C. for 8 minutes. A grey print having good all-round fastness properties, especially high temperature light fastness is obtained.

What is claimed is:
1. An aqueous ink comprising
i) 0.70 to 1.00% by weight of dyestuff component (A) comprising at least one dye of the formula

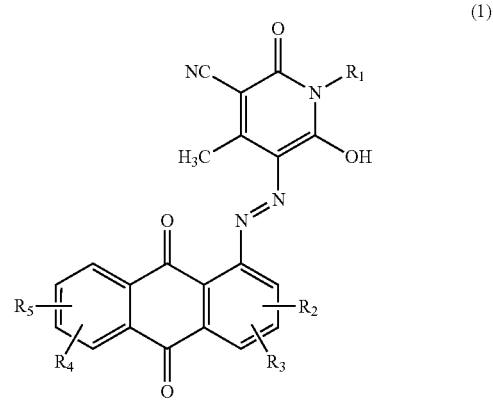

(1)

wherein
$R_1$ is $C_1$-$C_{12}$ alkyl, or $C_2$-$C_{12}$ alkyl interrupted by one or more oxygen atoms and/or —COO— groups, and
$R_2$, $R_3$, $R_4$ and $R_5$ each independently of the others is hydrogen, $C_1$-$C_{12}$ alkyl, chlorine, bromine, hydroxy or amino;
ii) 0.85 to 1.15% by weight of dyestuff component (B) comprising at least one dye of the formula

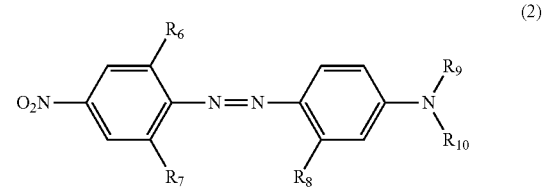

(2)

wherein
$R_6$ is hydrogen, bromine, chlorine or cyano,
$R_7$ is trifluoromethyl, bromine or chlorine,
$R_8$ is hydrogen, methyl or acetylamino,
$R_9$ and $R_{10}$ each independently of the other is $C_1$-$C_4$ alkyl unsubstituted or substituted by cyano or by acyloxy, one of the $C_1$-$C_4$ alkyl radicals $R_9$ and $R_{10}$ is substituted by cyano or by acyloxy;
iii) 1.10 to 1.50% by weight of dyestuff component (C) comprising at least one dye of the formula

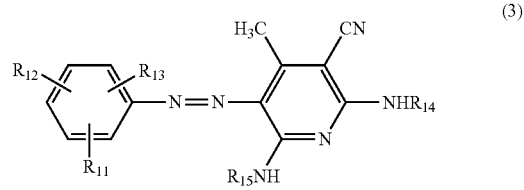

(3)

wherein
$R_{11}$ is fluoro, trifluoromethyl, trifluoromethoxy, trifluoromethylsulfonyl or cyano,
$R_{12}$ and $R_{13}$ each independently of the other represent hydrogen, $C_1$-$C_{12}$ alkyl, $C_1$-$C_{12}$ alkoxy, halogen, cyano, nitro, trifluoromethyl or —COOR$_{16}$, wherein R$_{16}$ is C$_1$-C$_{12}$ alkyl unsubstituted or substituted by one or more C$_1$-C$_{12}$ alkoxy, hydroxy, amino or halogen, and one of the radicals R$_{14}$ and R$_{15}$ denotes hydrogen or C$_1$-C$_6$ alkyl unsubstituted or substituted by hydroxy, C$_1$-C$_4$ acyloxy, C$_1$-C$_6$ alkoxy, C$_1$-C$_4$ acyloxy-C$_1$-C$_6$ alkoxy, or hydroxy-C$_1$-C$_6$ alkoxy, and the other one of the radicals R$_{14}$ and R$_{15}$ denotes C$_1$-C$_6$ alkyl unsubstituted or substituted by phenoxy-C$_1$-C$_6$ alkoxy, or phenyl that is unsubstituted or substituted by one or more substituents from the group C$_1$-C$_{12}$ alkyl, C$_1$-C$_{12}$ alkoxy and trifluoromethyl; and iv) 3.15 to 4.35% by weight of dyestuff component (D) comprising at least one dye of the formula

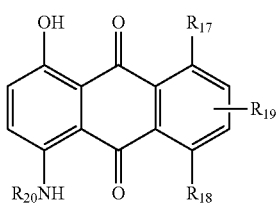

(4)

wherein
one of the radicals R$_{17}$ and R$_{18}$ denotes hydroxy and the other one of the radicals R$_{17}$ and R$_{18}$ denotes amino or nitro, R$_{19}$ is hydrogen or phenyl unsubstituted or substituted by one or more substituents from the group hydroxy and C$_1$-C$_6$ alkoxy, and R$_{20}$ denotes hydrogen or phenyl that is unsubstituted or substituted by one or more substituents from the group hydroxy, halogen, C$_1$-C$_6$ alkoxy or C$_1$-C$_6$ alkyl unsubstituted or substituted by hydroxyl where the % by weight is based on the overall weight of the dyestuff components in the aqueous ink.

2. The aqueous ink according to claim 1 wherein
R$_1$ is ethyl, n-propyl, n-butyl, isobutyl, n-hexyl, 2-ethylhexyl or 3-isopropoxypropyl, and
R$_2$, R$_3$, R$_4$ and R$_5$ are each hydrogen.

3. The aqueous ink according to claim 1 wherein R$_1$ is n-propyl, n-butyl, isobutyl or n-hexyl.

4. The aqueous ink according to claim 1 wherein
R$_6$ is bromine or chlorine,
R$_7$ is trifluoromethyl or chlorine,
R$_8$ is hydrogen or acetylamino, and
R$_9$ and R$_{10}$ is each cyanoethyl.

5. The aqueous ink according to claim 1 wherein dyestuff component (C) is at least one dye of formula

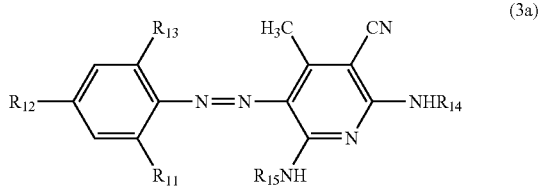

(3a)

wherein
R$_{11}$ is trifluoromethyl or cyano,
R$_{12}$ and R$_{13}$ each independently of the other represent hydrogen, fluoro, chloro, bromo, cyano or nitro, one of the radicals R$_{14}$ and R$_{15}$ denotes hydrogen, 2-hydroxyethyl or the radical of formula —(CH$_2$)$_2$—O—(CH$_2$)$_2$—OH, and the other one of the radicals R$_{14}$ and R$_{15}$ denotes the radical of formula —(CH$_2$)$_3$—O—(CH$_2$)$_2$—O-phenyl, or phenyl that is unsubstituted or substituted by one or more substituents from the group trifluoromethyl, n-propyl, n-butyl and n-butoxy.

6. The aqueous ink according to claim 1 wherein dyestuff component (D) is at least one dye from the group of formulae

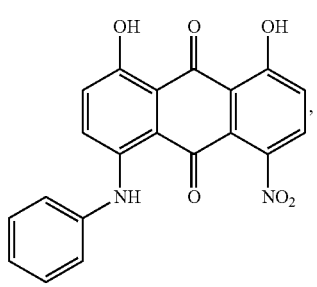

(401)

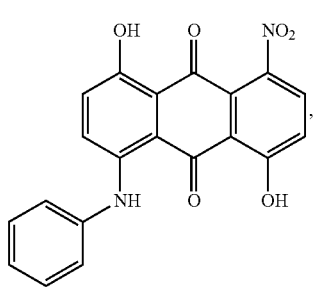

(402)

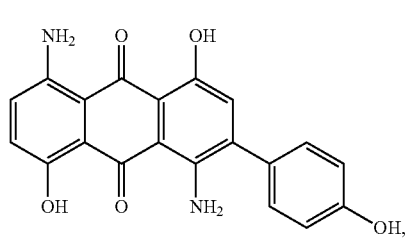

(403)

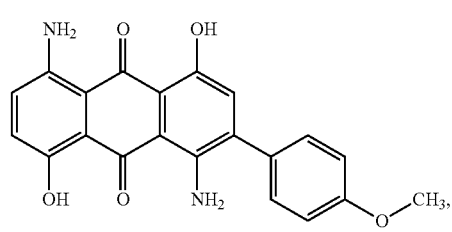

(404)

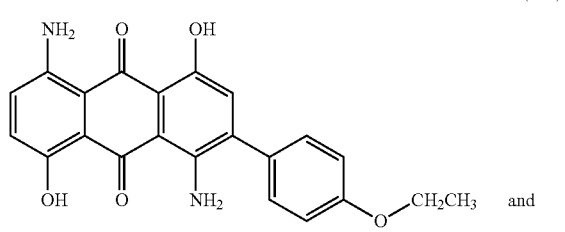

(405) and

-continued

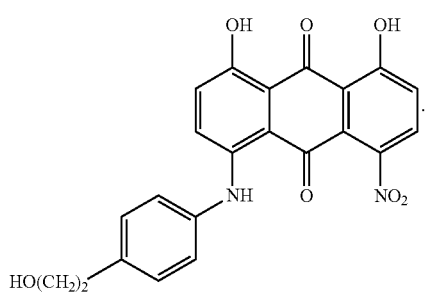
(406)

7. An ink-jet printing process for printing semi-synthetic or synthetic hydrophobic textile fibre materials, wherein the said fibre materials are printed with an aqueous ink according to claim 1.

8. An ink-jet printing process according to claim 7, wherein polyester fibre materials or fibre materials comprising blends of polyester with other fibres are printed.

* * * * *